US007093883B2

United States Patent
Tyrer

(10) Patent No.: US 7,093,883 B2
(45) Date of Patent: Aug. 22, 2006

(54) GOLF CART REARWARDLY EXTENDING CANOPY COVER

(76) Inventor: Stephen Edward Tyrer, 147 Taft Crescent, Centerport, NY (US) 11721

( * ) Notice: Subject to any disclaimer, the term of this patent is extended or adjusted under 35 U.S.C. 154(b) by 0 days.

(21) Appl. No.: 11/216,216

(22) Filed: Aug. 31, 2005

(65) Prior Publication Data
US 2006/0028046 A1 Feb. 9, 2006

Related U.S. Application Data

(63) Continuation of application No. 10/107,996, filed on Mar. 27, 2002, now Pat. No. 6,979,044.

(51) Int. Cl.
*B60P 7/02* (2006.01)
(52) U.S. Cl. .................................. 296/100.14
(58) Field of Classification Search ........... 296/100.14, 296/100.11–100.12, 100.16–100.18, 136.05, 296/136.1, 136.11–13, 77.1, 79, 80, 83; 280/DIG. 5; 160/370.22
See application file for complete search history.

(56) References Cited

U.S. PATENT DOCUMENTS

| 4,830,037 A | 5/1989 | Held |
| 5,010,941 A | 4/1991 | Ross, Sr. et al. |
| 5,588,690 A | 12/1996 | Showalter |
| 5,688,018 A | 11/1997 | Simpson |
| 5,722,594 A | 3/1998 | Farr et al. |
| 5,741,041 A | 4/1998 | Sullivan |
| 5,845,957 A | 12/1998 | Hurst |
| 6,007,134 A | 12/1999 | Weston |
| 6,216,714 B1 | 4/2001 | Tucker |
| 6,220,647 B1 | 4/2001 | Winkler |
| 6,227,217 B1 | 5/2001 | Peta |
| 6,227,603 B1 | 5/2001 | Brock |
| 6,416,109 B1 | 7/2002 | Tyrer |
| 6,481,780 B1 | 11/2002 | Dolan et al. |
| 6,547,312 B1 | 4/2003 | Winkler |
| 6,601,904 B1 | 8/2003 | Winkler |
| 6,663,161 B1 | 12/2003 | Tyrer |
| 6,663,162 B1 | 12/2003 | Tyrer |
| 6,709,043 B1 | 3/2004 | Beusse et al. |

*Primary Examiner*—H Gutman
(74) *Attorney, Agent, or Firm*—Hoffman & Baron, LLP

(57) ABSTRACT

An improved canopy assembly is provided for a rearwardly extending protective canopy for a motorized golf cart of the type having a top covering the passenger seating area and an uncovered bag storage area located rearward of the seating area. The canopy assembly may be extended where the protective canopy substantially covers the cart's golf bag storage area protecting the bags from rainfall. The canopy assembly may be folded where the protective canopy is moved out of the way allowing golf clubs to be removed from the golf bags without hitting the canopy assembly. In an embodiment of the present invention, the canopy includes a releasable fastener for allowing the upper front edge of the canopy to be attached to the lower bottom edge to retain the canopy in the folded position. A protective flap is used to cover the folded canopy, protecting it from weathering elements when it is not in use.

10 Claims, 17 Drawing Sheets

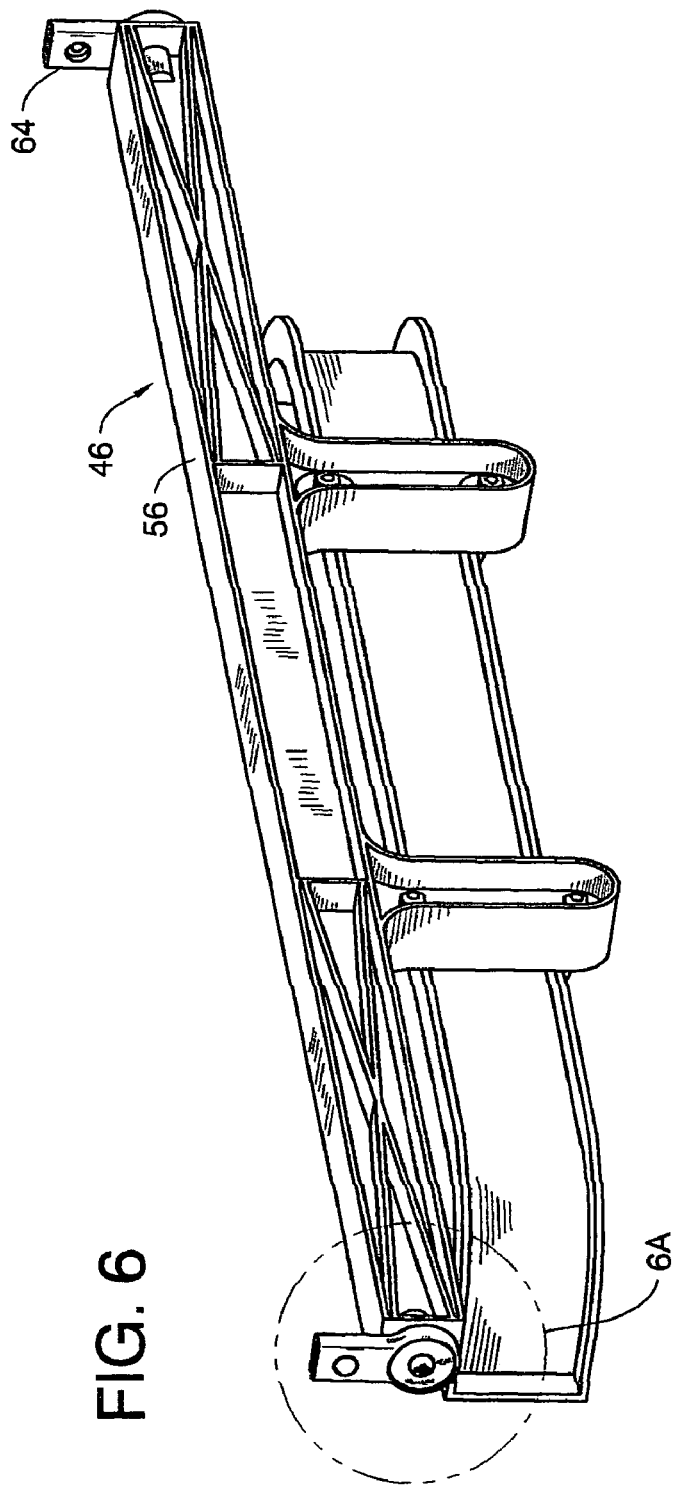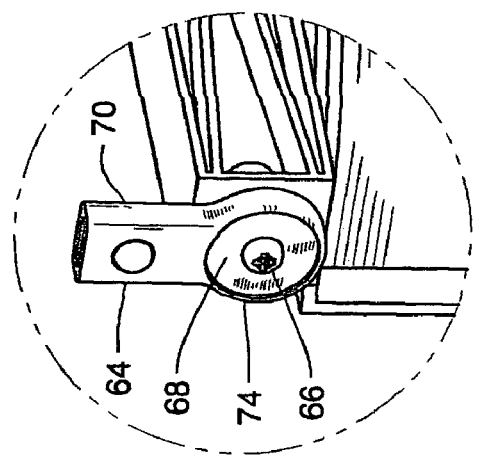

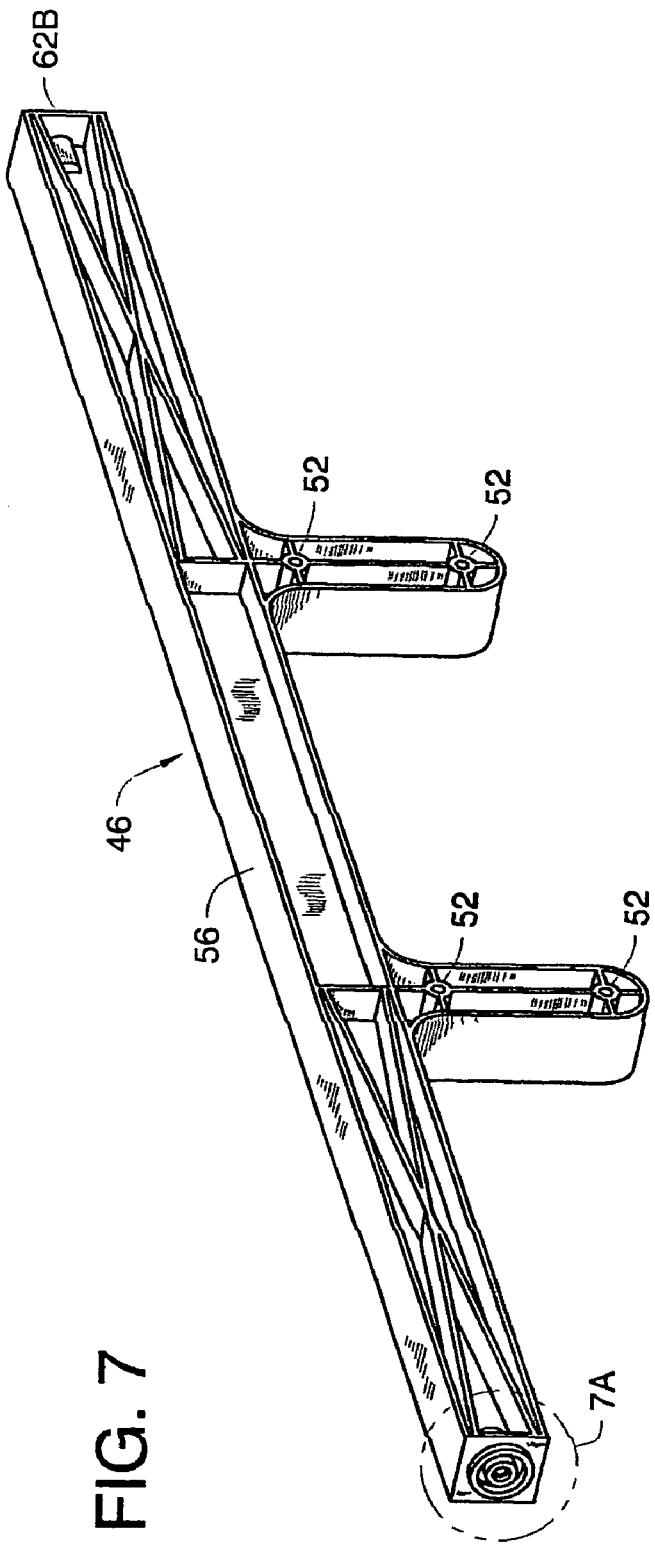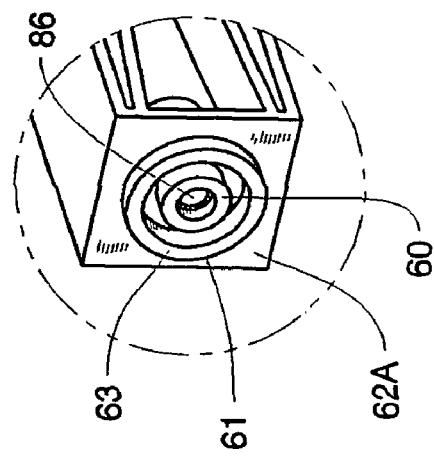
FIG. 7
FIG. 7A

GOLF CART REARWARDLY EXTENDING CANOPY COVER

CROSS REFERENCE TO RELATED APPLICATION

This application is a continuation of U.S. patent application Ser. No. 10/107,996, filed Mar. 27, 2002 now U.S. Pat. No. 6,979,044, which is incorporated herein by reference.

FIELD OF THE INVENTION

This invention relates generally to the field of golf cart canopy covers, specifically to an improved rearwardly extending canopy cover having a releasable fastener for securing the canopy in a folded up position.

DESCRIPTION OF THE RELATED ART

Canopy covers in the past have been utilized to protect golf bags and clubs located in the rear bag storage compartment of golf carts from rain and damp weather conditions. It is well known in the sport that wet golf club grips can hinder the performance of the player and is undesirable.

Generally, canopy covers attach to the back of the cart's top and to the cart's frame section that supports the top. The connection to the top is typically made with an extruded channel member that accepts the top edge of the canopy. The connection to the cart's frame is made using a structural base member that serves as a mounting base for a frame supporting the canopy. The base member generally attaches directly to the frame of the cart.

The majority of canopy covers in the past fold up and down to allow easy access to the golf clubs stored in the golf bags. It is well known that the rearwardly extending canopy cover hinders a player's ability to reach the golf clubs in the bag. Therefore, canopy cover designers in general allow for the covers to be stored in a folded up position when the cover is not in use. The methods in the past used to retain the cover in the folded position are not atheistically pleasing and generally do not conceal the canopy cover protecting it from weathering elements.

An example of a canopy cover to protect golf bags and clubs is U.S. Pat. No. 4,830,037 to William T. Held. This canopy cover discloses a cover that includes a channel that attaches to the back of the cart's top, base members that attach to the frame of the cart supporting the top of the cart and a canopy structure that supports the flexible canopy and is pivotally attached to the base member. In addition, Held discloses using hook and loop fastening means to retain the cover in the folded up position shown in Held. However, the cover is not neatly stored away when it is folded up. This results in an unsightly looking bundled up cover that is exposed to weathering elements and flops around in the wind when the cart is moving. It is also well known that hook and loop fasteners become clogged with debris, especially for outdoor applications and wear out over time.

Another example of a fold-up type canopy cover to protect golf bags is U.S. Pat. No. 6,220,647 to David R. Winkler. This patent discloses a rearwardly extending folding canopy cover. The canopy includes a flap that is sewn to the outside of the canopy substantially on the top. The flap rests on the top canopy when the canopy is extended to protect the golf clubs. The flap is described and shown as having a substantial width relative to the width of the top of the canopy. The flap is further described to include snaps or hook and loop fasteners that enable the flap to wrap over the top portion of the canopy and supporting brackets and connect to the underside of either the golf cart's top of the underside of the top edge of the canopy. In this way, the flap acts like a strap to retain the canopy in the folded position.

Winkler has several significant disadvantages. The flap disclosed does not protect the entire canopy, therefore, the flap does not provide protection of the canopy from weathering elements. In addition, the flap connects to the underside of the cart's roof or the underside of the top of the canopy. It would be difficult to find the corresponding snaps or hook and loop fasteners since the folded canopy can be very bulky. Additionally, the sides of the canopy are not restrained by the flap disclosed, making them to appear bulky and untidy and allowing the wind to cause them to flutter while the cart is moving. It would also leave the sides of the canopy exposed to wear and tear from branches and other environmental conditions commonly found on golf courses.

Another example of an enclosure to protect golf bags and clubs is U.S. Pat. No. 5,588,690 to Jerry M. Showalter. This patent discloses an enclosure that includes a roof panel, a hem portion coupled to the roof panel, a back cover coupled to the roof panel and a second back cover coupled to the roof panel. The invention described in this patent has several key disadvantages. When not in use, the enclosure's panels are rolled up and retained using straps surrounding the panel and snaps connecting the straps together. Again this retention method has the same concerns as Held in that the panel is not protected from weathering elements and the panel is sloppy and can flop in the wind. In addition, the snaps tend to rust and corrode making them difficult to operate after several seasons. Also, the snaps also can come unsnapped while the cart is moving allowing the panel to unravel.

Another example of a roll-up type cover to protect golf bags and clubs in U.S. Pat. No. 5,741,041 to Diane Sullivan. This patent discloses a roll-up type cover that utilizes a shock cord to attach the bottom of the cover to the cart and hooks to attach the top of the cover to the back edge of the cart's top. This cover utilizes hook and loop style straps to retain the cover in the rolled up position, therefore, it has the same disadvantages as the Held's cover retention mechanism.

Another example of a roll-up cover to protect golf bags and clubs is U.S. Pat. No. 5,688,018 to John Albert Simpson. This patent discloses another roll-up type cover similar to U.S. Pat. No. 5,741,041 to Diane Sullivan and shares the same disadvantages. Simpson also discloses hook and loop style connecting straps that have the previously discussed disadvantages.

Therefore, a rearwardly extending canopy cover that has an improved releasable fastening mechanism for retaining the canopy in a folded up position and that provides protection from weathering elements in that folded up position is desired.

BRIEF SUMMARY OF THE INVENTION

The present invention provides an improved canopy assembly for attachment onto a golf cart to protect golf bags and clubs located in the back of the cart from rain. The invention allows the user to quickly extend the canopy to protect clubs and bags from rainfall and just as quickly fold up the cover to allow access to the clubs. The invention provides a new and improved method of retaining the canopy in the folded up position by utilizing a protective flap and a releasable fastener. This allows the cover to be neatly and securely stored in a folded position. The protective flap forms a cover for the canopy to be stored within, protecting it from weathering elements and preventing the canopy from flapping in the wind while the cart is moving.

It is to be understood that both the preceding summary and the following detailed description are intended to be exemplary and explanatory and are intended to provide a further explanation of the invention claimed. The invention will best be understood by reference to the following detailed description read in conjunction with the accompanying drawings.

BRIEF DESCRIPTION OF SEVERAL VIEWS OF THE DRAWINGS

These and other advantages of the present invention will become more fully apparent as the following description is read in conjunction with the drawings, wherein:

FIG. 6 is a rear perspective view of the example base member including the pivot arms secured to the bag support without the cart or the canopy present;

FIG. 6A is an enlarged partial view of the pivot arm mounted on the example base member;

FIG. 7 is a rear perspective view of the example base member only that may be used with the present invention;

FIG. 7A is an enlarged partial view of the end of the example base member;

DETAILED DESCRIPTION OF THE PREFERRED EMBODIMENTS

Figure 1:
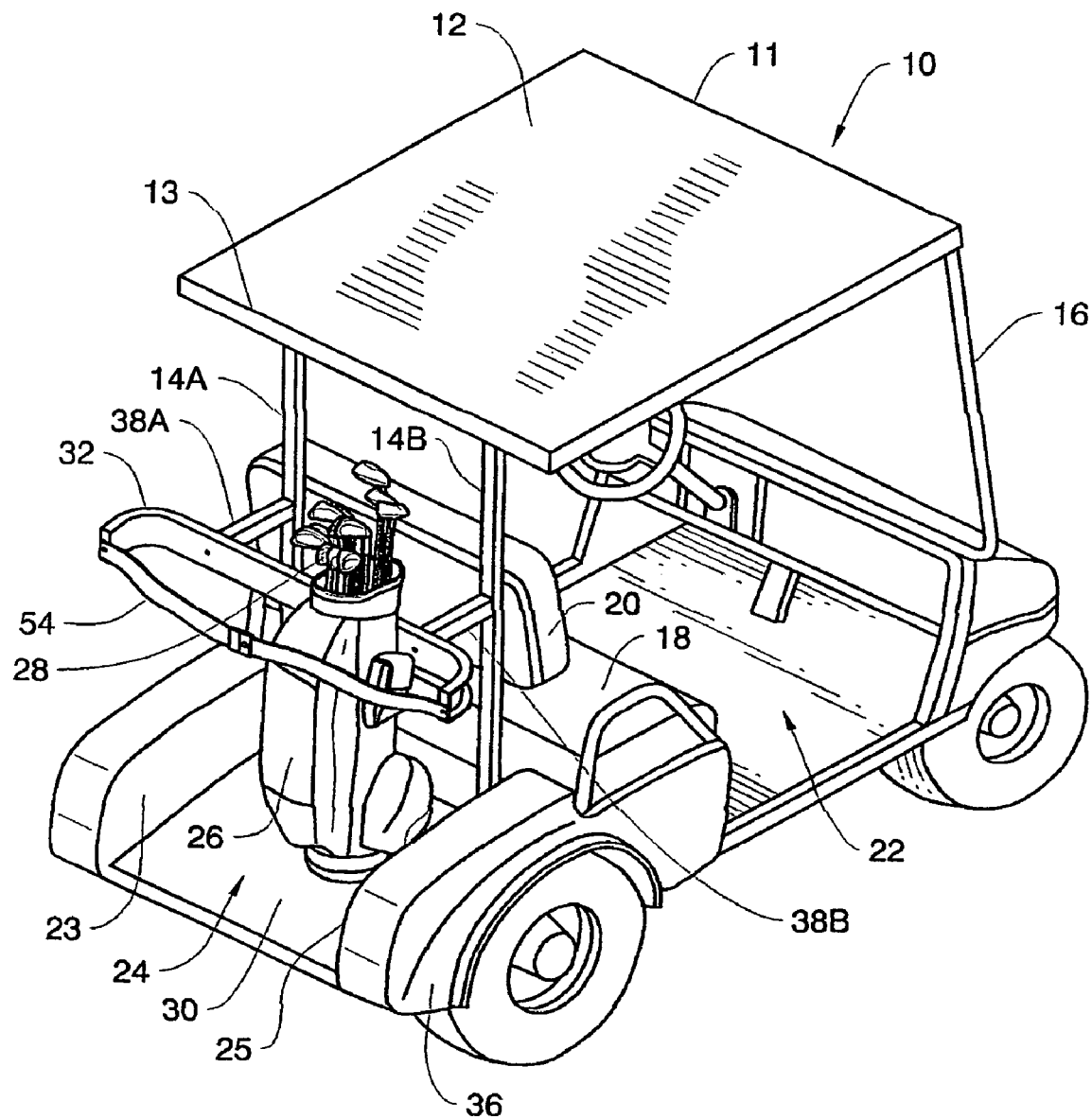
FIG. 1 is a rear perspective view of a golf cart in which the present invention may be used.
Figure 3:
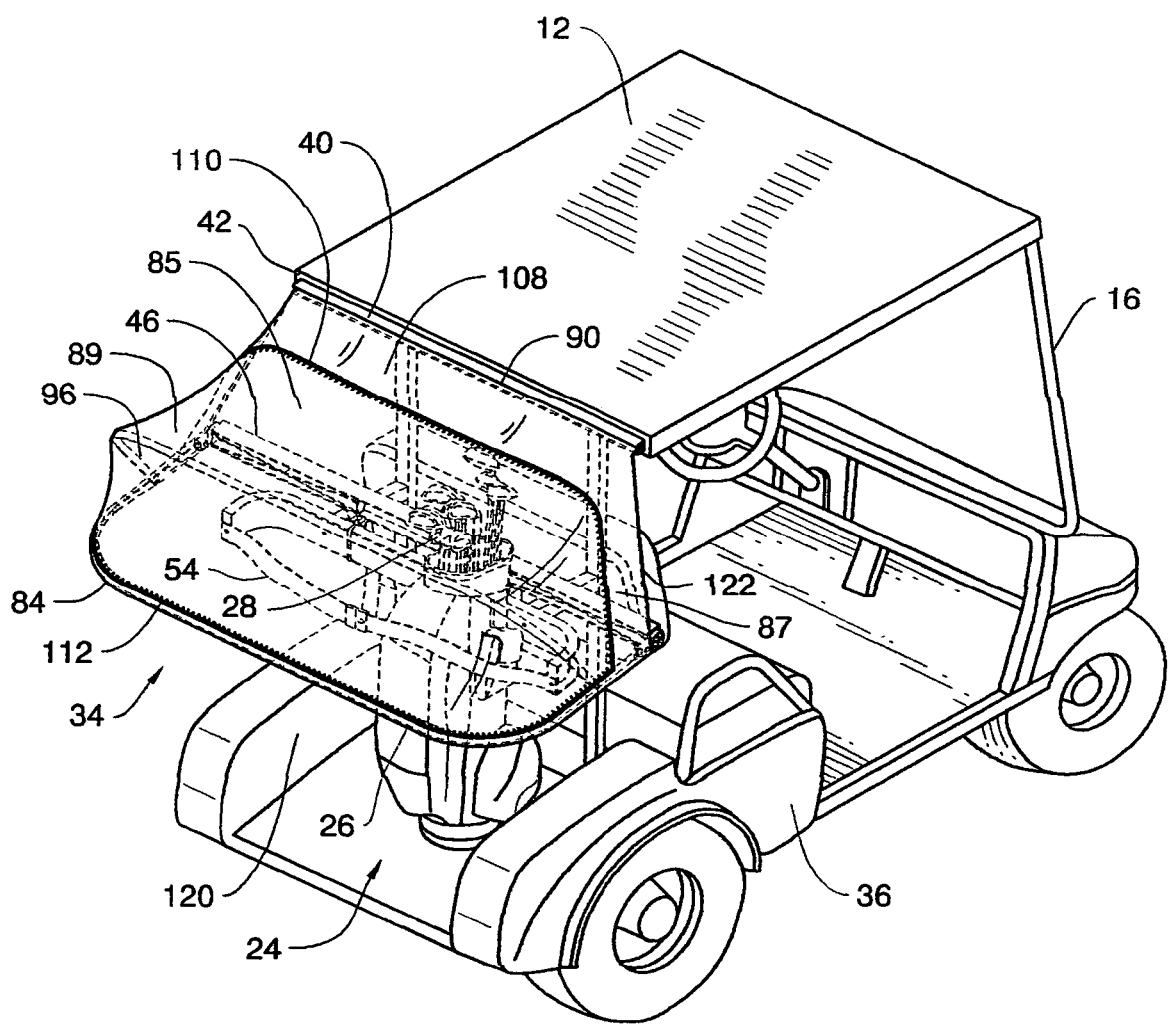
FIG. 3 is a rear perspective view of the golf cart with the present invention attached with the cover extended to protect the golf bag and clubs from rain.

FIG. 1 shows a perspective view of a motorized golf cart 10 to which an embodiment of a canopy attachment in accordance with the present invention, generally indicated as a canopy assembly 34 in FIG. 3, can be attached. Cart 10 has a top 12 that is attached to the upper ends of rear frame members 14A and 14B and the upper portion of a front frame member 16 using fasteners. Top 12 is preferably a molded plastic part and is used to protect passengers sitting in a passenger compartment 22 from rain. The passengers sit on a seat 18 with their back resting on a seat back 20. Behind seat back 20 is a bag storage area 24.

With reference again to FIG. 1, bag storage area 24 is used to store one or more golf bags 26 containing golf clubs 28. The bottom of golf bag 26 rests on a bottom 30 of a cart body 36. The upper portion of the golf bag is supported by a U-shaped bag support 32 that prevents golf bag 26 from tipping over. Bag support 32 is preferably a molded plastic part with straps 54 attached to it to secure the golf bag to the bag support. Bag support 32 is mounted onto golf cart frame extensions 38A and 38B of cart 10 using fastening means (not shown), as for example threaded bolts and nuts. Frame extensions 38A and 38B are made of metal and attached to rear frames 14A and 14B by fastening means, welding or are a continuous extension of the rear frames.

Referring again to FIG. 1, bag storage area 24 is generally formed as part of cart body 36 that opens toward the rear of the cart. The bag storage area is defined by bottom 30, two opposite sides 23, 25 and seat back 20. Top 12 has a front edge 11 and a rear edge 13 and is located above passenger compartment 22. The top does not cover the bag storage area to allow the player to remove golf clubs 28 from golf bag 26 without hitting the golf club on the underside of top 12 while trying to lift the golf club out of the golf bag. Therefore, the bag storage area and the golf bag are exposed to rainfall. In order to protect bag storage area 24, it is necessary to have a cover that can be folded out of the way so that the player may remove the golf clubs without being hindered by a covering directly above golf bag 26.

Figure 2:
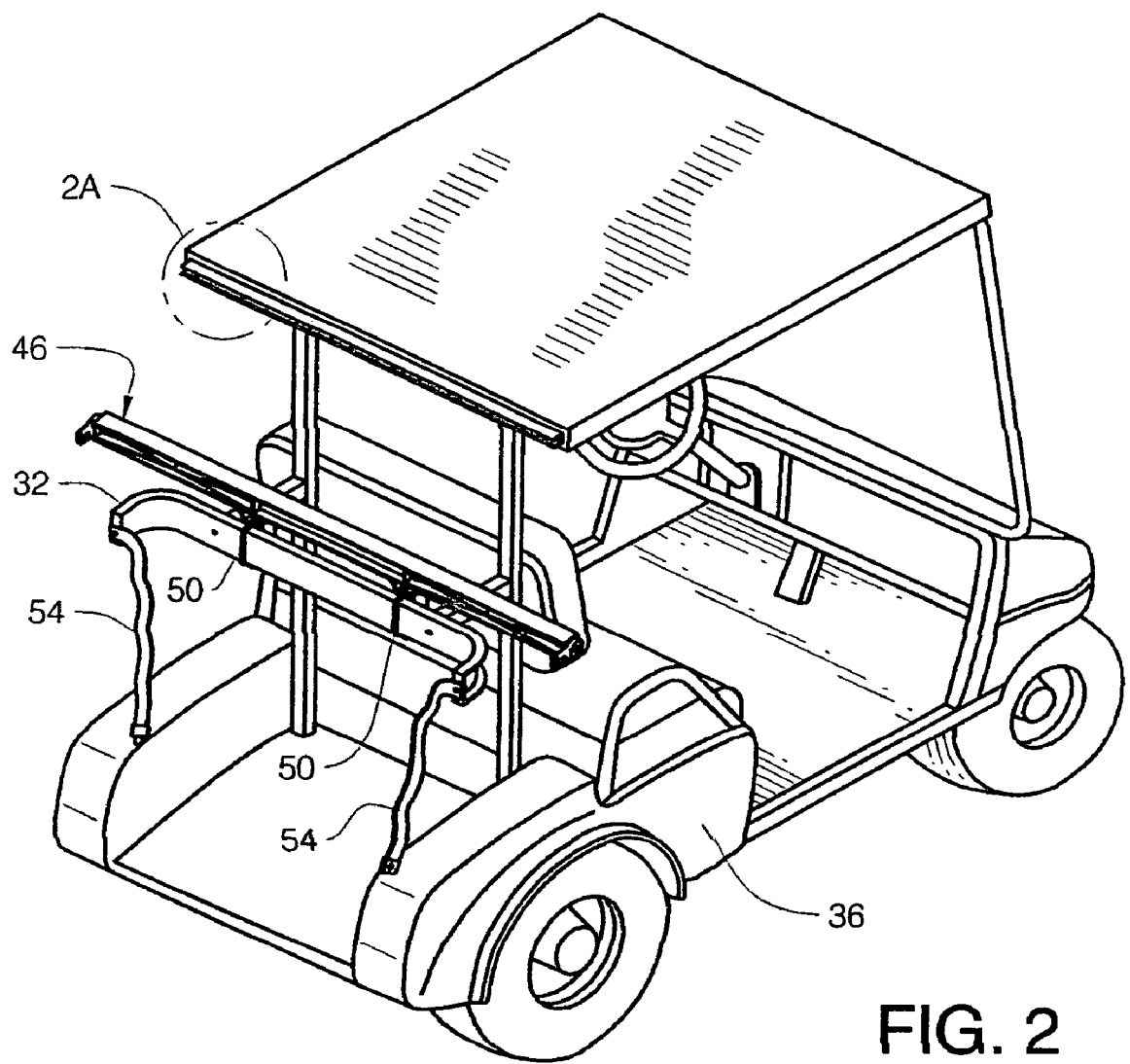
FIG. 2 is a rear perspective view of the golf cart with example canopy attachment members mounted to the cart that may be used with the present invention.
Figure 2A:
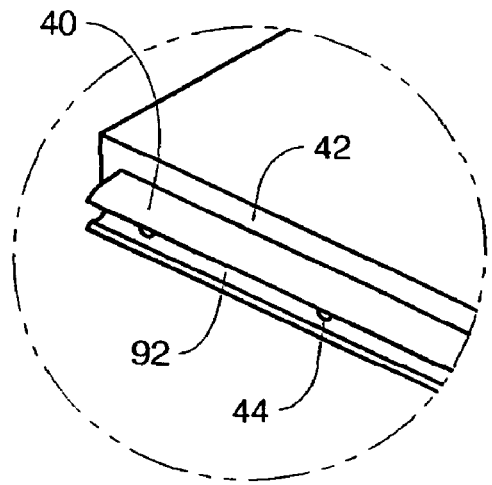
FIG. 2A is an enlarged partial view of an example channel attached to the rear of the top that may be used with the present invention.
Figure 4:
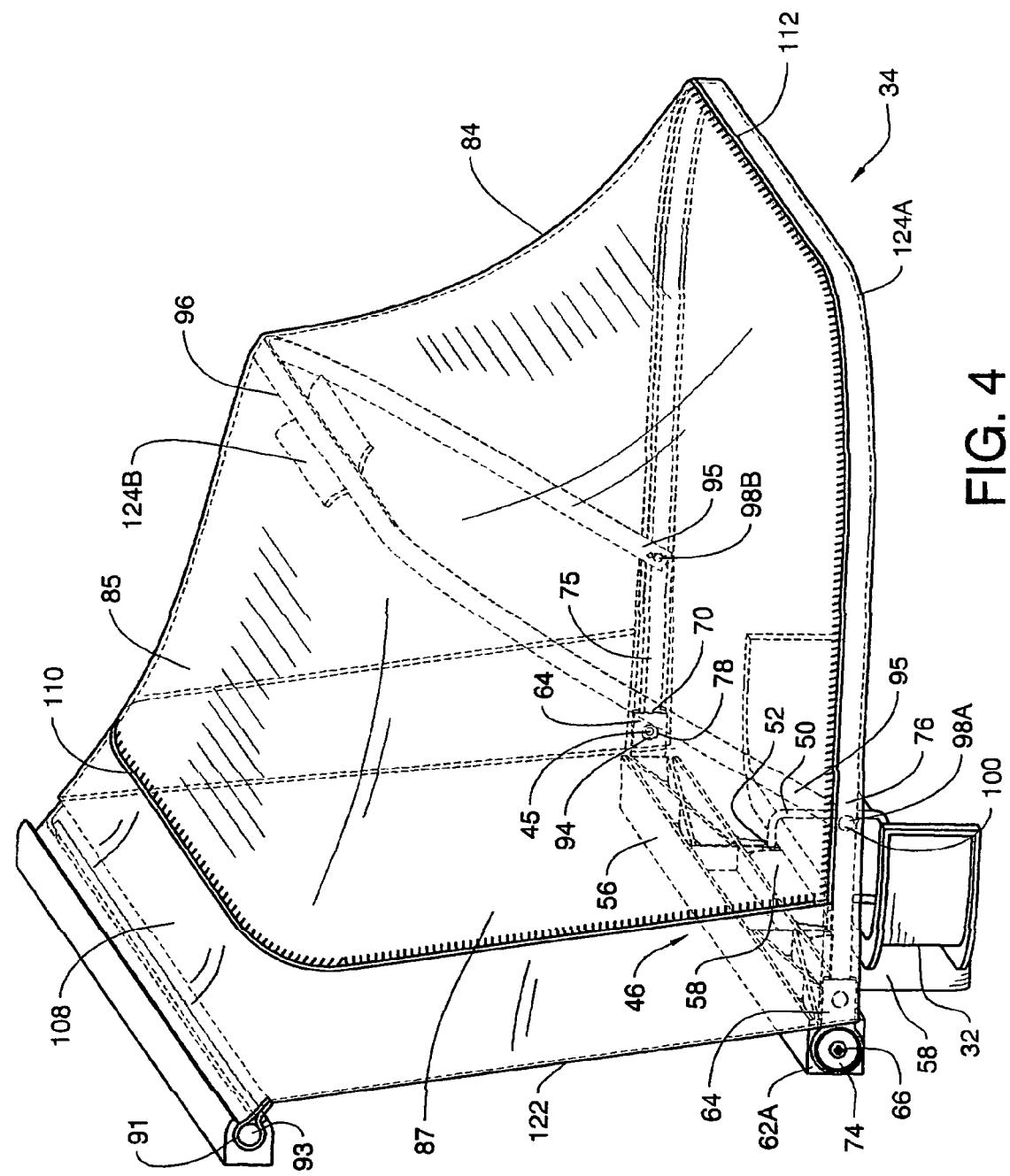
FIG. 4 is a side perspective view of the present invention, shown attached to the cart's bag support bracket to display an example attachment method without the cart present and with the cover extended.

FIGS. 2 and 2A show components, that may be used and are shown for example purposes, used to mount an embodiment of this invention referred to as a canopy assembly 34, as shown in FIG. 3, to cart 10. A channel 40 is secured to a rear face 42 of top 12 preferably using rivets 44. However, screws, bolts or other fastening means could be used in place of rivets 44. A base member 46 is a structural bracket that is a fastening member attached to bag support 32 by U-bolts 50, as shown in FIGS. 2 and 4. The U-bolts surround the bag support and pass through holes 52 in flanges 58. It should be understood that other means for securing the base member to the golf cart could be used in place of using the U-bolts to attach the base member to the golf bag support bracket. As for example, the base member could be attached directly to the frame of the golf cart instead of the golf cart's golf bag support bracket using fasteners like a bolt and nut assembly. Base member 46 could also be replaced by two separate base members that each support one end of the canopy or other fastening members. The base member could be made into other geometric shapes, as for example a simple elongated member 46A, shown in FIG. 11, that is directly attached to frame extensions 38A and 38B by bolts 142. Other shapes would also work like a L-shaped cross section beam instead of an I-shaped cross section beam, a stamped metal member, etc. The base member could also be attached to other portions of the cart's frame. Therefore, the described base member 46 attached to bag support bracket 32 only illustrates a method of attaching this embodiment of the present invention.

The channel, shown in FIGS. 2 and 2A, is preferably one continuous piece of extruded aluminum, however, extrude plastic will also work. The channel has a substantially C-shaped cross section with a rearward opening 92. Alternatively, other engagement mechanisms like hook and loop fastening strips, snaps or other fastening means could be mounted to the top of the canopy and the back face of the cart top instead of the channel.

A canopy 84, shown in FIGS. 3 and 4, has a rolled and a sewn top edge 90 forming a sleeve 91 that a rod 93 is slid endwise into until the end of rod 93 corresponds to the ends of the sleeve forming rounded top edge 90. Rod 93 has a length about the same as the length of channel 40. The sleeve and rod are sized to allow them to be inserted as an assembly endwise into the C-shaped cross section of channel 40. Top edge 90 has a diameter larger than opening 92 in channel 40 preventing the top edge from passing through opening 92, therefore, securing the top edge within channel 40. Rod 93 may be constructed of a rigid material as for example plastic or metal. Alternatively, the rod could be eliminated and the top edge could be rolled and sewn to form a diameter larger than opening 92. Another alternative would be to not connect the top of the canopy to the top of the golf cart's top 12.

Figure 5:
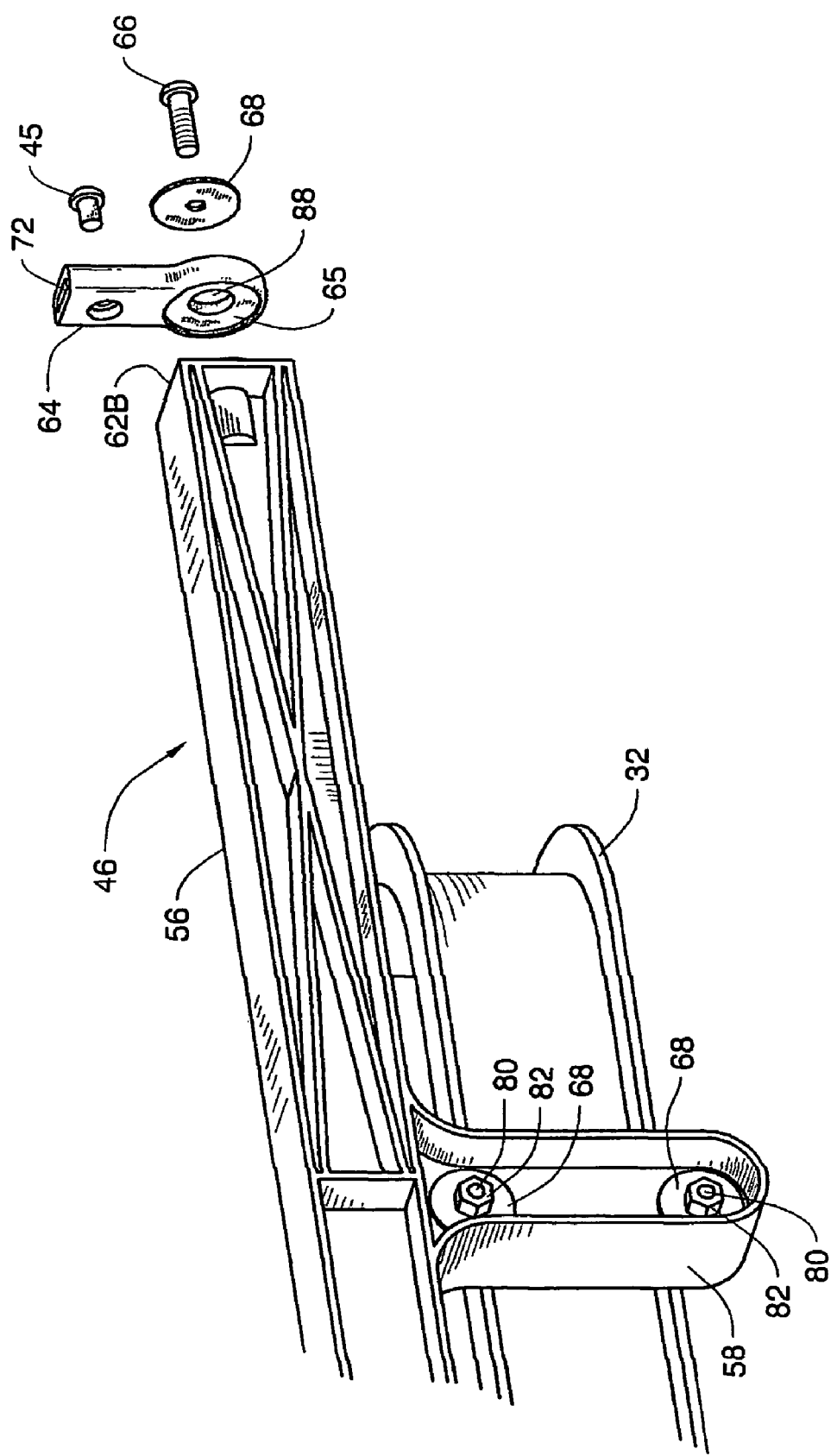
FIG. 5 is a partial rear perspective view of an example the base member, that may be used with the present invention, secured to the bag support with the pivot arm and associated hardware exploded the canopy and cart are eliminated from clarity.

As shown in FIGS. 4 and 5, U-bolts 50 are used to secure base member 46 to bag support 32 and are secured using washers 68 placed onto U-bolt ends 80 and threaded nuts 82 that thread onto ends 80 of the U-bolts. When the nuts are tightened, flanges 58 contact the back face of bag support 32 clamping them together. U-bolts 50 are preferably made from metal as for example steel. Alternatively, base member 46 could be mounted directly to the cart's frame instead of bag support 32 using the U-bolts or other types of fasteners, as for example standard threaded bolts with corresponding nuts.

Figure 11:
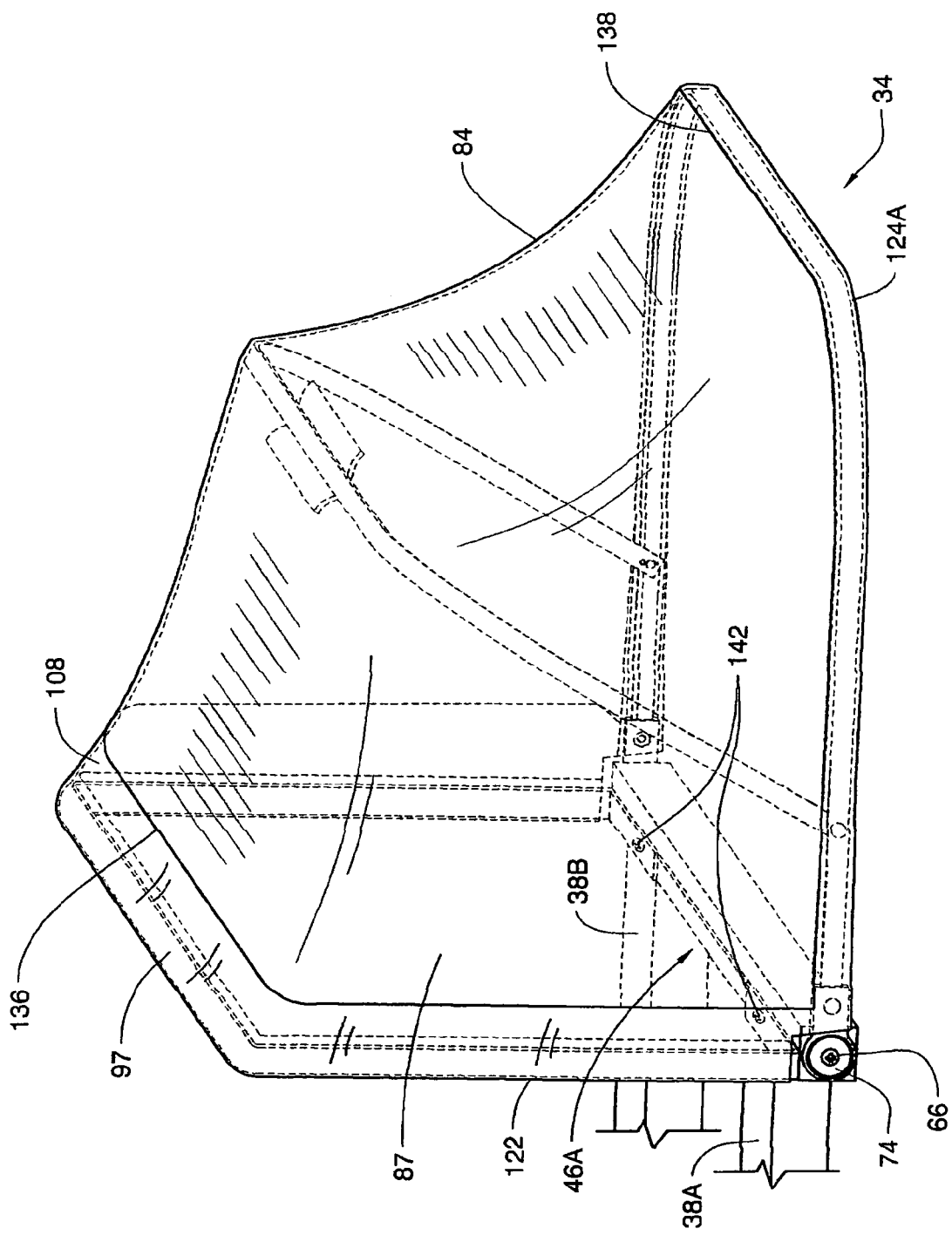
FIG. 11 is a side perspective view of the present invention illustrating how a tongue and groove mechanically interlocking strip could replace the zipper and further showing how the canopy of the present invention does not need to be attached to the rear of the golf cart top assembly.

With reference to FIGS. 5, 7 and 7A, bas member 46 is preferably one continuous piece of high strength molded plastic, as for example nylon, with a beam 56 spanning the upper portion and two mounting flanges 58 extending from the bottom of the beam. The width of the beam corresponds to the width of the bag storage area. End faces 62A and 62B are located on opposite ends of beam 56. A cylindrical inner boss 60 extends from each end face 62A and 62B to form a mounting cylinder for a pivot arm 64, shown in FIG. 6A, to mount onto. A cylindrical outer ring 61 also extends off of end faces 62A and 62B surrounding inner boss 60. Both the inner boss and the outer ring are formed as part of base member 46. The outer ring provides a mating surface 63 that contacts a pivot face 65 on pivot arm 64 when the pivot arm is assembled onto inner boss 60 using a screw 66. The surface to surface contact between surface 63 and pivot face 65 creates constant contact during rotation of the pivot arm offering increased joint stability. Beam 56 has a generally I-beam shaped cross section that provides structural rigidity for the base member 46. Flanges 58 provide mounting extensions of the beam that contact the back face of bag support 32, as previously described. The flanges contain holes 52 that the ends of the U-bolts pass through. The flanges are formed as a continuous part of beam 56. The base member and associated components have been shown to describe and illustrate an example of components that may be used to mount the present invention. Alternatively, the beam could have other cross-sections and the flanges could be eliminated, with the beam directly fastening to the cart's bag support or frame. As for example, FIG. 11 illustrates elongated member 46A directly bolting to the cart's frame extensions 38A and 38B, replacing base member 46A.

With reference to FIGS. 6A, 7 and 7A, on each end of beam 56 are end faces 62A and 62B. Inner boss 60, formed as part of the base member, contains a small diameter screw bore 86 in the center of the boss. The bore has a diameter slightly smaller than the outside diameter of the threads on screw 66 and is sized to allow screw 66 to self-tap into the screw bore to secure pivot arm 64 onto inner boss 60 on each end of beam 56, as shown in FIG. 6. Washer 68 is used to distribute the clamp force of screw 66 on pivot arm 64 holding the pivot arm on the inner boss and keeping mating surface 63 in contact with the pivot face 65, shown in FIG. 5, on pivot arm 64. Alternatively, pivot arms 64 could be attached using rivets or other fastening methods that would still allow the pivotal attachment of pivot arms 64 to beam 56.

With reference to FIGS. 5, 6A and 7A, pivot arm 64 is a separately molded plastic part made from a high strength, molded plastic, as for example nylon. The pivot arm contains a pivot hole 88 that has a diameter that is slightly larger than the outside diameter of inner boss 60 allowing the pivot arm to rotate around the inner boss when the pivot arm is slid over the boss and secured in place by washer 68 and screw 66, as shown in FIG. 6A. Both the screws and the washer are preferably made of steel. Pivot arm 64 extends outward from a cylindrical mounting end 74 and transitions to a rectangular cross section receiving a end 70, shown in FIG. 6A, that has a hollowed rectangular socket 72, shown in FIG. 5, that is sized to receive a end 75 of a support bracket 76, as shown in FIG. 4. In this way, the pivot arms form a pivotal joint for support bracket 76 to attach to the base. The pivot arms have been shown and described to illustrate an example method of pivotally attaching support bracket 76 of the present invention to beam 56. Alternatively, the pivot arms could be eliminated and the ends of a mid-support bracket 96 and support bracket 76 could be directly pivotally attached to beam 56 providing another means from pivotally attaching the frame structure formed by the support brackets to the base member.

With reference again in FIGS. 4 and 5, support bracket 76 is a member shown to illustrate one method that may be used to structurally support canopy 84 and is generally a U-shaped continuous rigid support with opposite ends 75 that have a rectangular cross section to facilitate insertion into socket 72. In this way, the support bracket is pivotally connected to base member 46. The length of support bracket 76 corresponds to the size of bag storage area 24 to ensure that when the support bracket is extended, it covers the majority of the bag storage area. Near the ends of the support bracket 76 are rivet holes 94 that align with clearance holes 78 in the pivot arms to allow the insertion of rivets 45. Rivets 45 secure ends 75 of support bracket 76 into sockets 72 and prevent the ends of the support bracket from coming out of sockets 72 because the rivets cannot slide through sockets 72. Alternatively, support bracket 76 could be made from several sections that are assembled together, as for example several molded sections that are fastened together. The support bracket could be pivotally attached using other methods, therefore, the described method is for illustration purposes of what could be used.

With reference again to FIG. 3, canopy 84 can be made from a thin sheet of flexible water-resistant material like vinyl that is sewn together. Canopy 84 is defined by a canopy top 85 and two generally opposing canopy sides 87 and 89. The canopy has a bottom portion with a bottom edge 120 having a lower zipper half 112, a top edge 90 and a front canopy edge 122 that define the limits of the canopy. Additionally, the canopy includes a flap 108. The flap can be made from a thin sheet of flexible water-resistant material like vinyl. The flap has a front and back boundary. The front boundary of the flap is sewn to the canopy, however, other means for attaching the flap to the canopy may be used. For example, the front boundary could be plastic welded or adhesive mounted to the canopy. Flap 108 has a upper zipper half 110 sewn to the flap's back boundary or bottom edge. The upper zipper half corresponds to the lower zipper half. The zipper halves may or may not be attached to each other on one end and may be made from metal or plastic. In this way, the lower zipper half and upper zipper half connect to form a releasable fastener. Flap 108 forms a layer on top of a portion of canopy top 85 and is sewn near or on the front edge of canopy 84.

It should be understood that the upper and lower zipper halves could be replaced by other types of releasable fasteners, as for example, snaps, mechanically interlocking plastic, hook and loop strips or grommet type button fasteners commonly called turn buckles.

With reference again to FIG. 4, support bracket 76 and a mid-support bracket 96 provide a frame structure for supporting the canopy. The mid-support bracket is generally an U-shaped continuous support with opposite ends 95 that have rectangular cross sections. However, the mid-support bracket could be made of several sections fastened together. The length of the mid-support bracket corresponds to the desired shape of the canopy that it supports. Both the support bracket and mid-support bracket are made of a semi-rigid material like spring steel or a high strength plastic, as for example nylon. Both the support bracket and mid-support bracket pass through sewn channels 124A and 124B respectively in the canopy to locate them in the desired position within canopy 84. However, other coupling features could be used to connect the support brackets to the canopy. In this way, the canopy is attached to support bracket 76 and mid-support bracket 96. Support bracket 76 has pin holes 98A that align with pin holes 98B in mid-support bracket 96 allow pins 100 to pass through, pivotally connecting the support bracket and mid-support bracket together. Lock pins 102 are assembled onto the ends of pins 100 to secure the pins in position. In this way, the mid-support bracket is free to pivot about pins 100 relative to support bracket 76. Support bracket 76 and mid-support bracket 96 together makeup a frame structure for supporting the canopy. Alternatively, both the support bracket and the mid-support bracket could both pivotally attach to the ends of beam 56. Another alternative would be to modify the shown pivot arms so that both support bracket 76 and mid-support bracket 96 attach directly to the pivot arms that is pivotally attached to beam 56. Support bracket 76 and mis-support bracket 96 have been shown and described to illustrate how the present invention may be structurally supported, however, other methods may be employed.

With reference again to FIGS. 3 and 4, canopy assembly 34 is attached to cart 10 and is extended to protect golf bag 26 and golf clubs 28 from adverse weather conditions like rainfall. In the extended position shown, canopy 84 is pulled taunt from within channel 40 and stretches over mid-support bracket 96 and down over support bracket 76. Therefore, channel 40, mid-support bracket 96 and support bracket 76 cooperate to support canopy 84. In this way, canopy 84 covers bag storage area 24 and remains in this position due to the weight of the canopy, support bracket 76 and mid-support bracket 96. Alternatively, a front support bracket could be added to support canopy top edge 90 replacing channel 40. In this way, the canopy would not have to attach to the golf cart's top.

Figure 8:
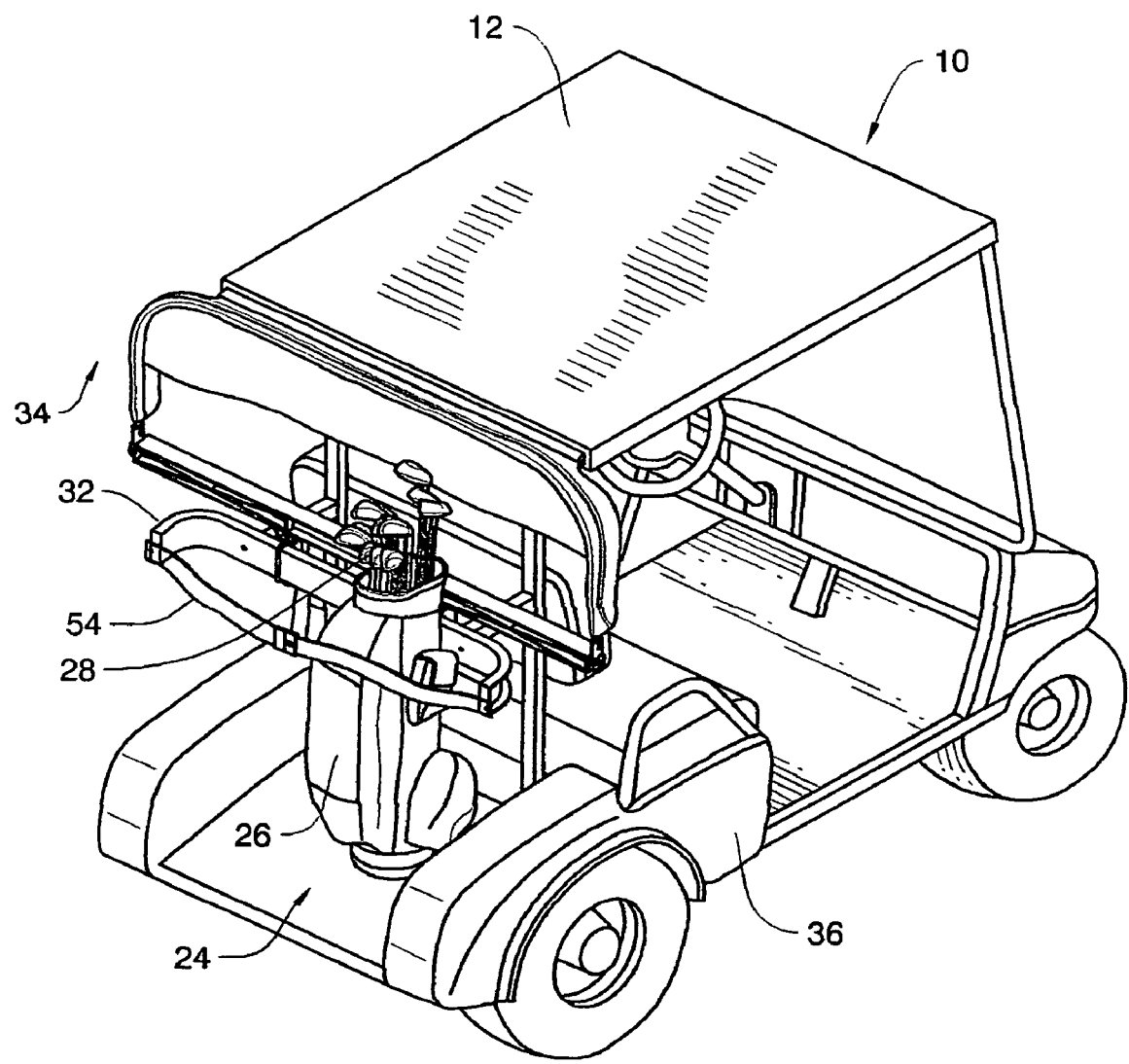
FIG. 8 is a perspective view of the cart with the present invention attached and the canopy folded up to allow access to the golf clubs.

With reference to FIG. 8, canopy assembly 34 is attached to cart 10 and is in a folded up position to allow access to golf bag 26 and golf clubs 28. Canopy 84 is folded up from the extended position, as shown in FIG. 4, by gripping the bottom of canopy 84 near support bracket 76 and lifting the support bracket upwardly, toward the back of top 12. The moment force created from this lifting action causes pivot arms 64 to rotate around inner bosses 60. The mid-support bracket pivots relative to support bracket 76 around pins 100. At approximately the halfway point of folding up, the canopy support bracket 76 contacts mid-support bracket 96 with the cover material folded in-between them and begins to rotate upwardly toward the back of top 12. When the lifting action is completed, both support bracket 76 and mid-support bracket 96 are substantially vertical and the canopy is slipped under outer flap 108. Lower zipper half 112 is connected with upper zipper half 110, preventing the canopy from folding back out in the extended position and neatly sandwiching the canopy under the protective flap. Therefore, the canopy is held in the folded position, as shown in FIG. 8, by the mechanical connection of the upper and lower zipper halves. In the folded up position, the canopy is protected from weathering elements and from wear and tear due to golf course obstacles like tree branches and bushes. The player may extend the canopy by unzipping the upper and lower zipper halves and pulling the bottom of canopy 84 near support bracket 76 downwardly and toward the back of the cart. This will extend the cover over bag storage area 24, as shown in FIG. 3.

Figure 9:
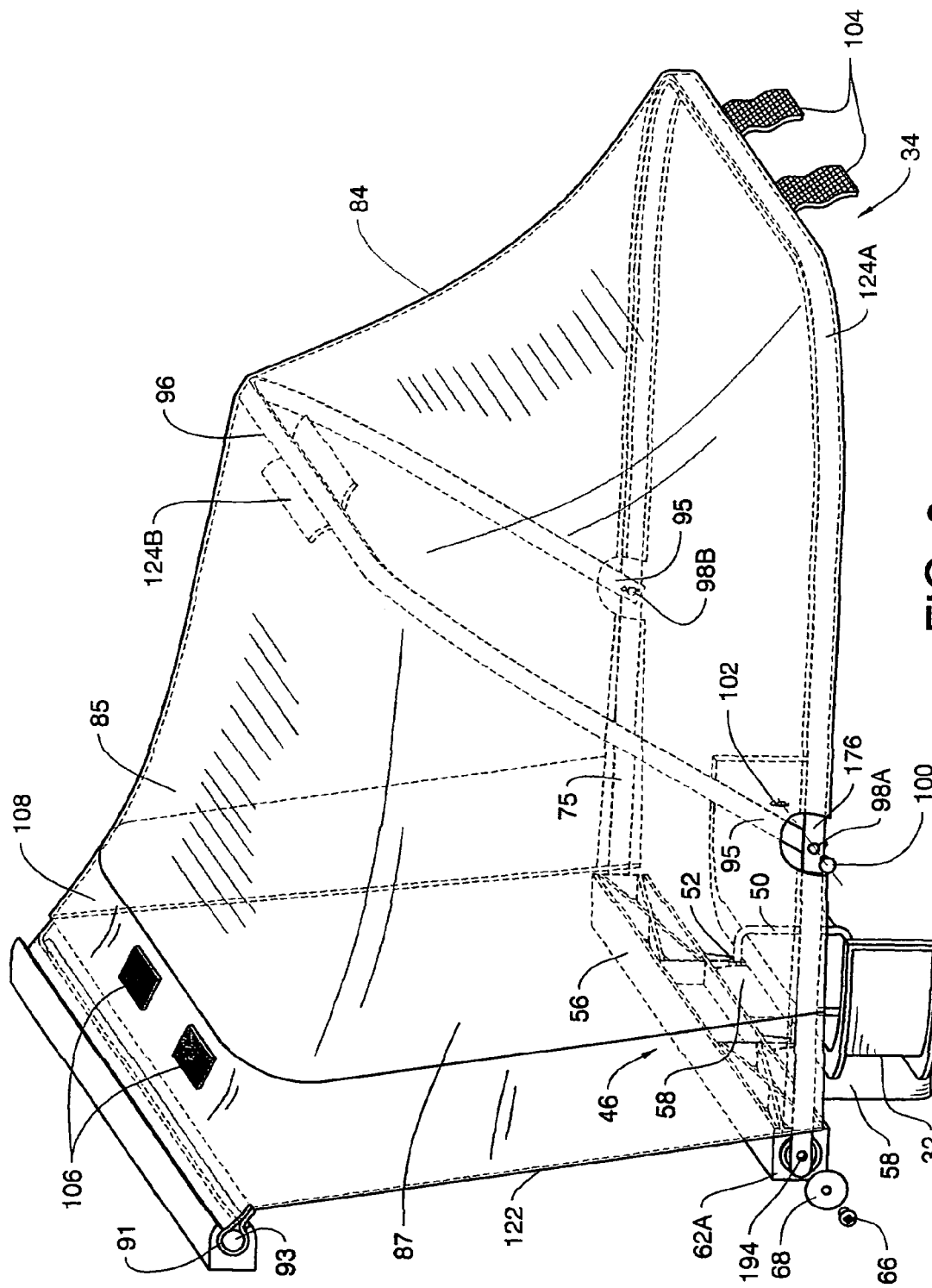
FIG. 9 is a side perspective view of the present invention having hook and loop connection means.

It should be understood that the pivotal attachment of the support brackets for the canopy could be made in a variety of ways. For example, in FIG. 9 pivot arms 64 and rivet holes 94, shown in the original embodiment, are eliminated. Pivot holes 194 are assembled directly onto inner boss 60. A modified support bracket 176 is pivotally attached directly to base member 46 in the same way as pivot arms 64, as previously described. Additionally, the upper and lower zipper halves, previously described in this invention, could be replaced by other types of mechanically connecting fasteners. For example, the upper and lower zipper halves, previously described, have been eliminated in FIG. 9. Instead, hook straps 104 that are attached to the bottom edge of the canopy can be fastened to loop patches 106 that are attached to the outside surface of flap 108 when the canopy is folded up. In this way, the canopy is kept in the folded position by the straps.

Figure 10:
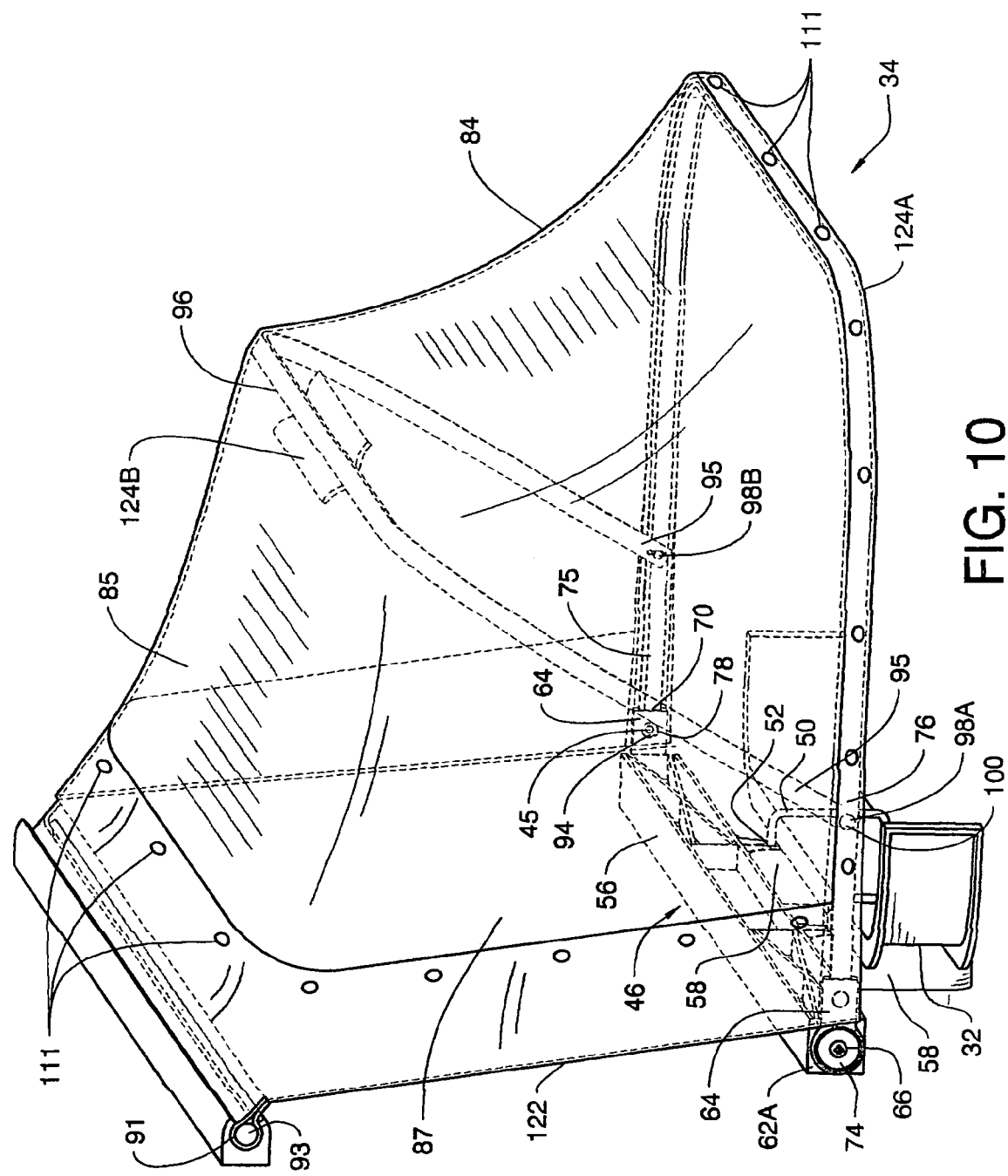
FIG. 10 is a side perspective view of the present invention with snaps replacing the zipper.

Another example of how the upper and lower zipper halves, shown in FIG. 3, could be replaced by another fastener is shown in FIG. 10. The upper and lower zipper halves have been replaced with a plurality of snaps 111. The snap could be made from either metal or plastic. It should also be understood that other fastening methods could be employed instead of the snaps or hook and loop fastening strips.

Another example of how the upper and lower zipper halves, shown in FIG. 3, could be replaced by another fastener shown in FIG. 11. A tongue 136 and a groove 138 fastening strip replace the zippers, providing for another type of releasable fastener. Tongue 136 can be connected to groove 138 when the canopy is folded up. The tongue and the groove can be made from flexible plastic or rubber. In addition, top edge 90 of the present invention need not be attached to rear edge 13 of cart top 12. The canopy could be attached to a upper support bracket 97, shown in FIG. 11 instead of attaching to rear edge 13 of golf cart top 12. Upper support bracket 97 can be connected to elongated member 46A using bolts 142 that pass through frame extensions 38A and 38B of the golf cart. The upper support bracket could be made from metal or strong plastic like a glass or mineral filled polymer. This type of frame structure could be used on the present invention if the designer does not want to connect to the golf cart top.

Figure 12:
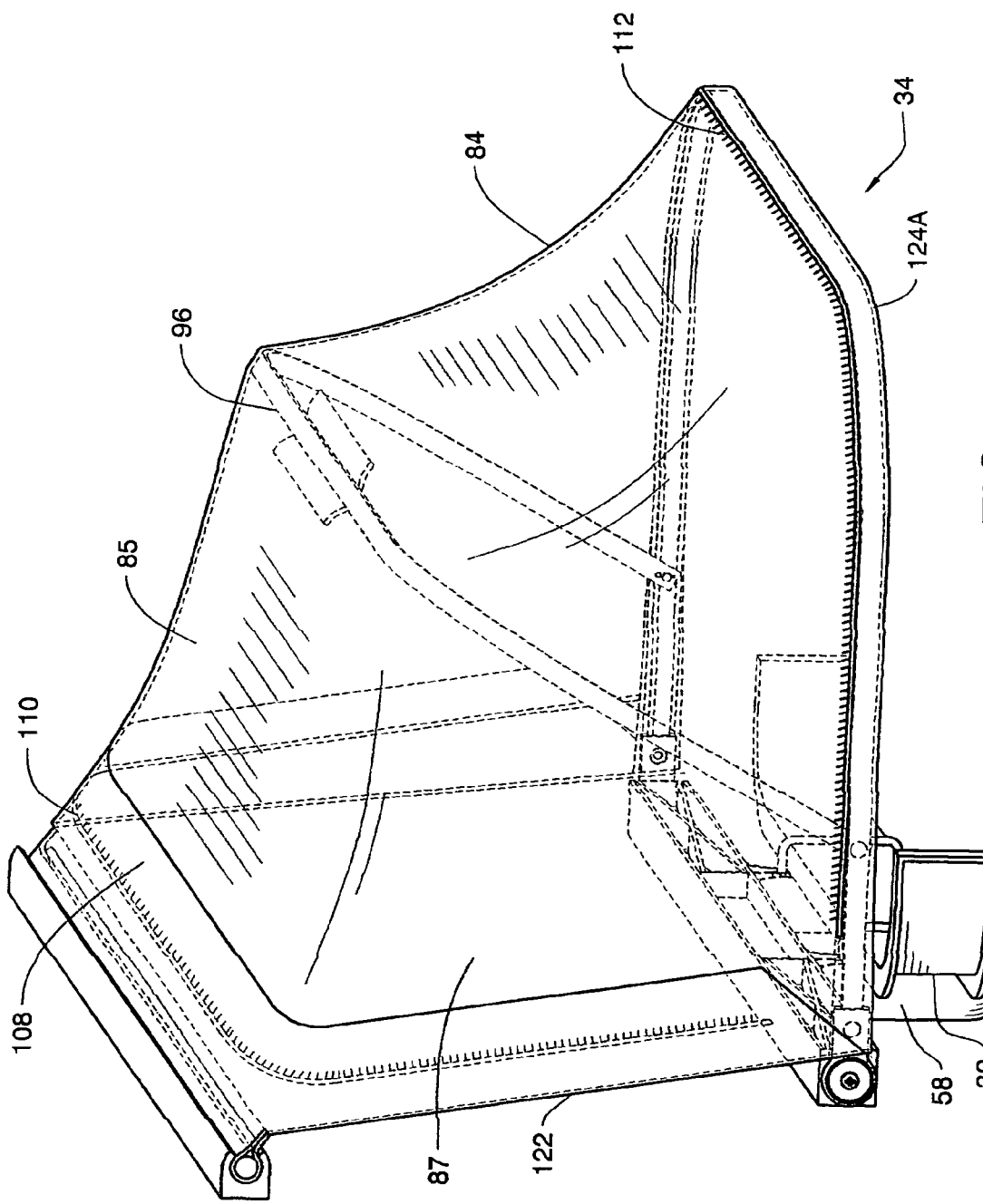
FIG. 12 is a side perspective view of a first alternate embodiment of the present invention having the upper zipper half sewn underneath the flap onto the top of the canopy.

In a first alternative embodiment of the present invention, as shown in FIG. 12, upper zipper half 110 is sewn or otherwise attached to canopy top 85 under flap 108. When the canopy is folded up, lower zipper half 112 is connected to upper zipper half 110 with flap 108 covering the folded up canopy, protecting it from weathering elements. It should be understood that other fastening methods could be employed instead of the zipper, as for example snaps, hook and loop fastening strips, tongue and groove fastening strips and other types of mechanically interlocking plastic fasteners.

Figure 13:
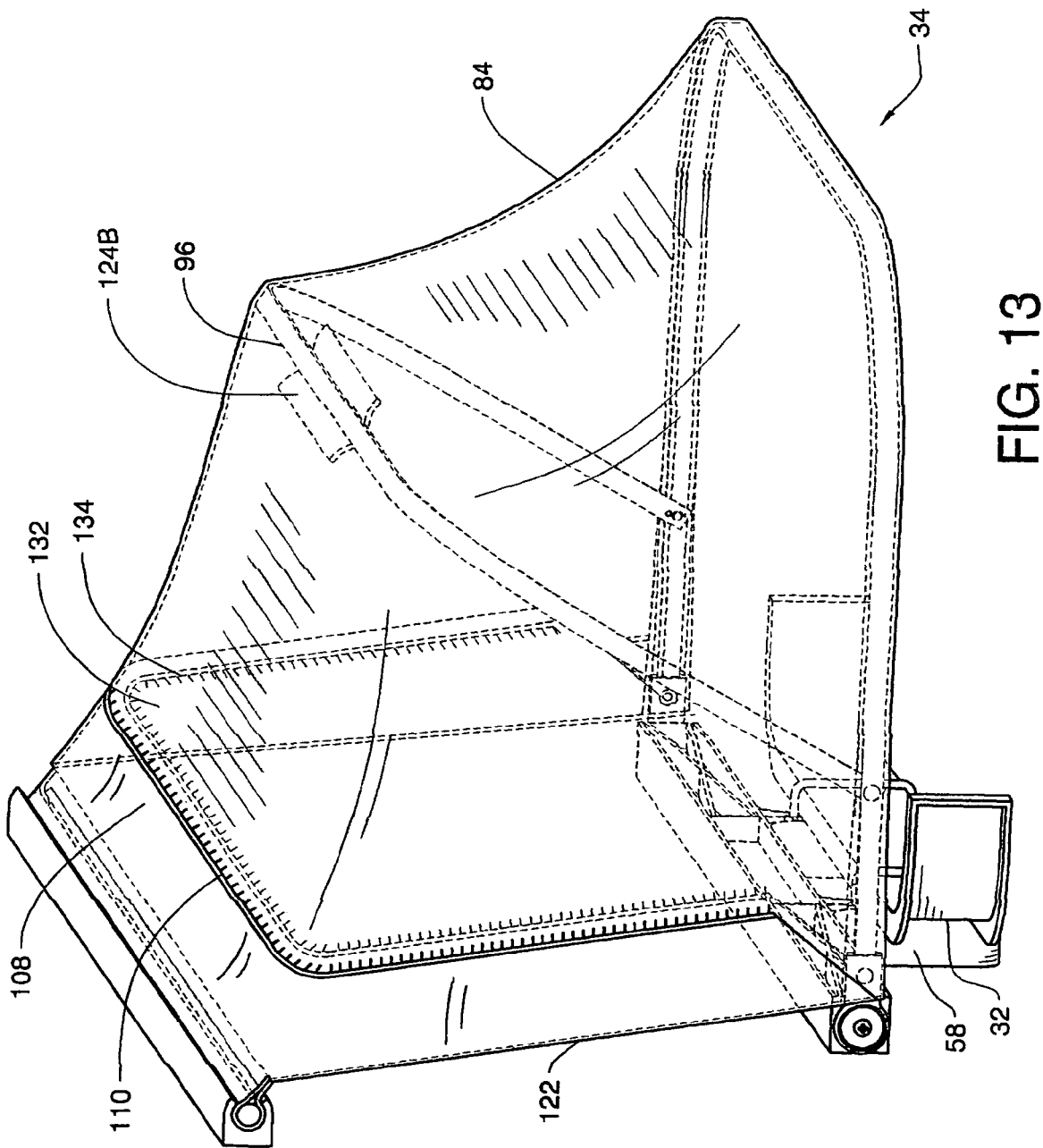
FIG. 13 is a side perspective view of a second alternate embodiment of the present invention having an inner flap with a zipper half that zips to an outer flap that has a corresponding zipper half.

In a second alternative embodiment of the present invention, as shown in FIG. 13, flap 108 and upper zipper half 110 have a corresponding inner flap 132 and an inner zipper half 134. When the canopy is folded up, the inner flap can be connected to outer flap 108 by connecting upper zipper half 110 to corresponding inner zipper half 134. When zipped together, the flaps form a protective pocket that the canopy is protected within. It should be understood that other fastening methods could be employed instead of the zipper, as for example snaps, hook and loop fastening strips, tongue and groove fastening strips and other types of mechanically interlocking plastic fasteners.

Figure 14:
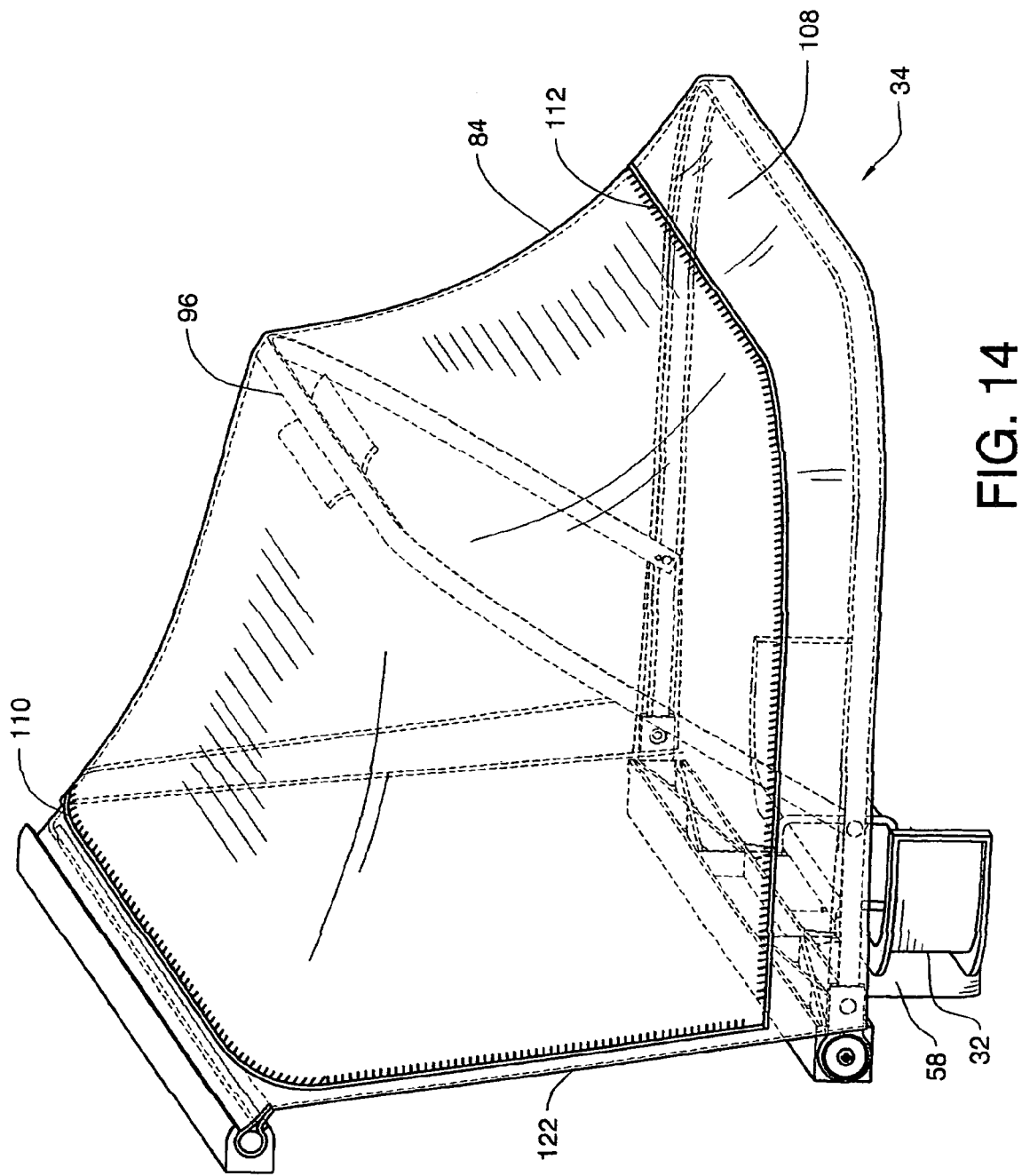
FIG. 14 is a side perspective view of a third alternate embodiment of the present invention with the upper half of the zipper sewn substantially on the top edge of the canopy and a flap attached to the bottom portion of the canopy.

In a third alternative embodiment of the present invention, as shown in FIG. 14, flap 108 has been moved to the bottom of the canopy as shown. The back boundary of the flap is sewn or otherwise attached to the canopy. In this embodiment, lower zipper half 112 is sewn substantially onto the front boundary of flap 108 and the upper zipper half 110 is sewn or otherwise attached substantially on the top front edge of the canopy. Therefore, the zipper halves are approximately located at the described locations. It should be understood that other fastening methods could be employed instead of the zipper, as for example snaps, hook and loop fastening strips, tongue and groove fastening strips and other types of mechanically interlocking plastic fasteners. When the canopy is folded up, flap 108 covers over the top of the folded canopy, protecting it from weathering elements.

Figure 15:
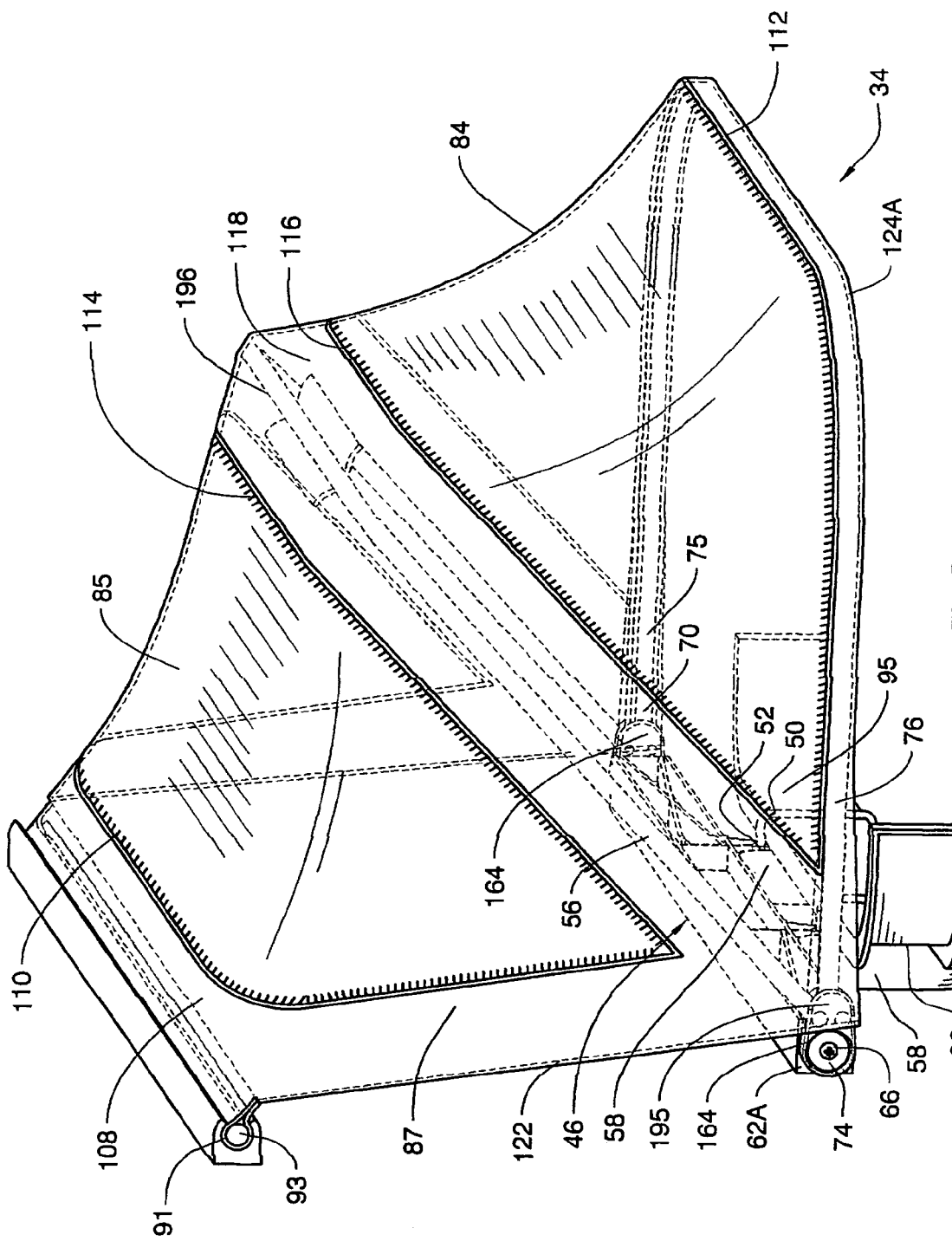
FIG. 15 is a side perspective view of a fourth alternate embodiment of the present invention having two additional zippers.

In a fourth alternative embodiment of the present invention, as shown in FIG. 15, an upper middle zipper half 114 is sewn to the canopy substantially on the middle. A lower middle zipper half 116 is sewn to the bottom edge of a lower middle flap 118. In this embodiment, the canopy can be retained in a folded-up position by connecting upper zipper half 110 to upper middle zipper half 114 and lower middle zipper half 116 to the lower zipper half 112. Canopy top 85 folds under flap 108 and the lower portion of canopy folds under lower middle flap 118, protecting the canopy from weathering elements. This embodiment is shown as an example illustration of another method that may be used with present invention. A modified mid-support bracket 196 attached to modified pivot arms 164 that pivotally attach to base member 46. In this way, both the modified mid-support bracket and the support bracket are pivotally attached to modified pivot arms 164. It should be understood that other fastening methods could be employed instead of the zipper, as for example snaps, hook and loop fastening strips, tongue and groove fastening strips and other types of mechanically interlocking fasteners.

Figure 16:
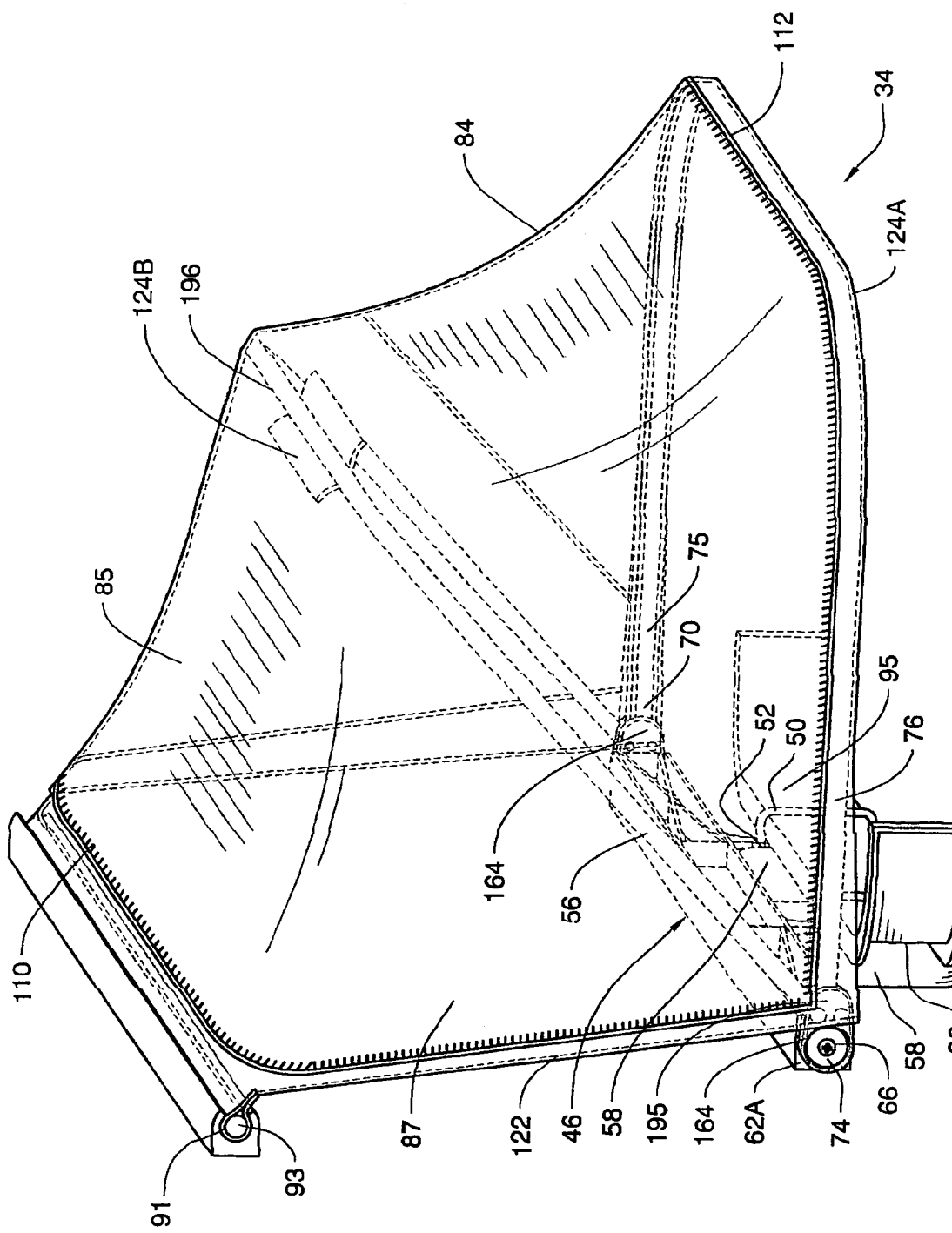
FIG. 16 is a side perspective view of a fifth alternate embodiment of the present invention without the protective flap.

In a fifth alternative embodiment of the present invention, as shown in FIG. 16, upper zipper half 110 is sewn onto the upper portion of the canopy top. Flap 108, included in the original preferred embodiment, has been eliminated. When the canopy is folded up, the upper zipper half is attached to the corresponding lower zipper half 112. In this way, the canopy is retained in the folded up position. The canopy is protected from weathering elements because it is folder under the connected upper and lower zipper halves. In addition, this fifth alternative embodiment is shown with modified mid-support bracket 196 and support bracket 76, each supporting the canopy are attached to modified pivot arm 164 on the ends of beam 56. It should be understood that other fastening methods could be employed instead of the zipper, as for example snaps, hook and loop fastening strips, tongue and groove fastening strips and other types of mechanically interlocking plastic fasteners.

Figure 17:
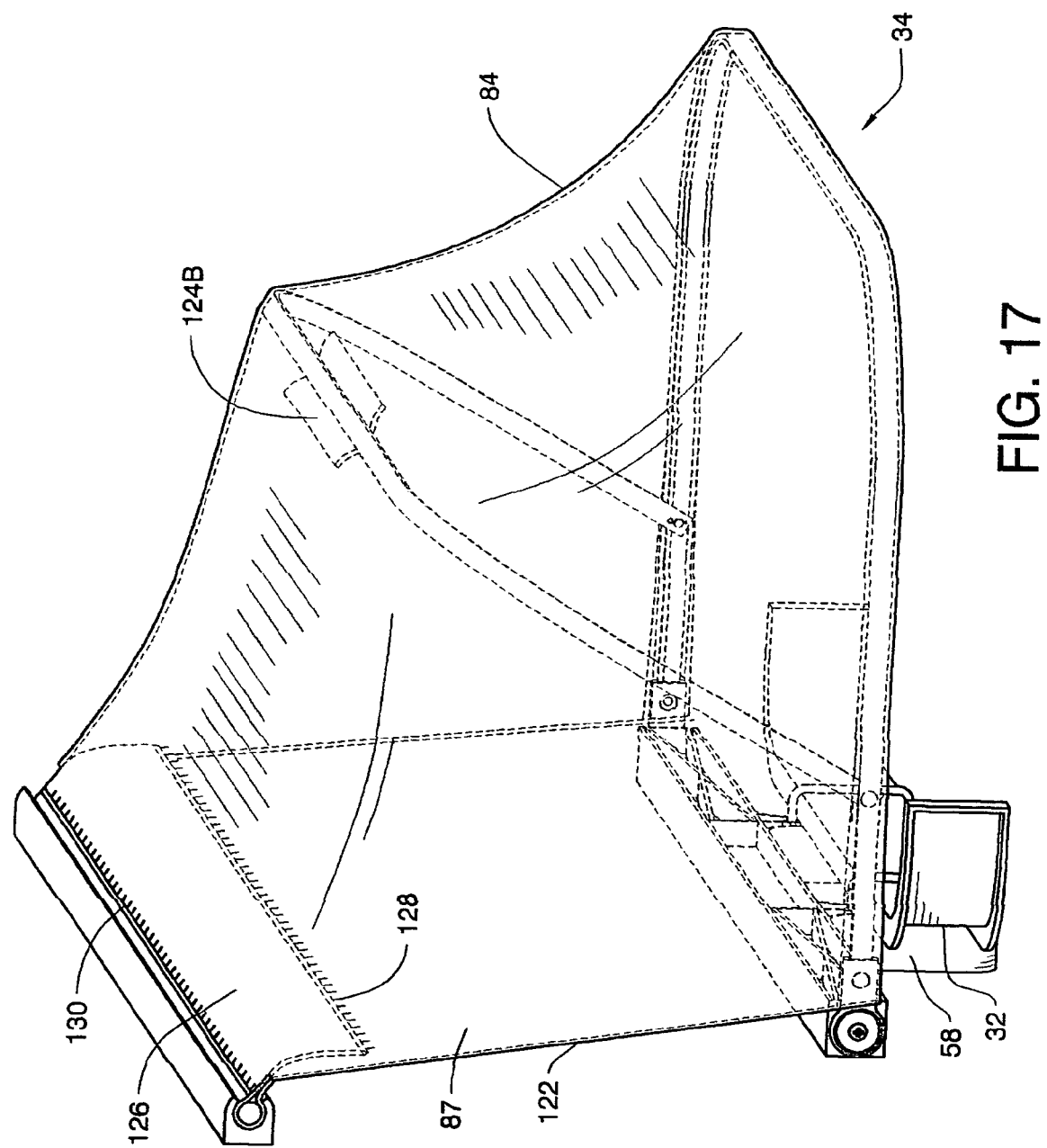
FIG. 17 is a side perspective view of a sixth alternate embodiment of the present invention having a top flap sewn to the underside of the canopy and a zipper for securing the canopy in a folded up position.

In a sixth alternative embodiment of the present invention, as shown in FIG. 17, a top flap 126 is located under canopy top 85 and is attached at its front boundary to the underside of the canopy. A lower flap zipper half 128 is sewn or otherwise attached to the back boundary of top flap 126. An upper flap zipper half 130 is sewn or otherwise attached to the outside of canopy top 85 substantially on the front edge. When the canopy is folded up, the upper flap zipper and lower flap zipper halves are connected with the top flap surrounding the top portion of the folded canopy, protecting it from weathering elements. It should be understood that other fastening method could be employed instead of the zipper, as for example snaps, hook and loop fastening strips, tongue and groove fastening strips and other types of mechanically interlocking plastic fasteners.

CONCLUSION, RAMIFICATIONS, AND SCOPE OF INVENTION

Accordingly, one skilled in the art will recognize that the canopy rain cover of this invention can be used for rain protection on a motorized golf cart easily and conveniently and has an improved releasable fastener for retaining the canopy in the folded up position. In addition, the preferred embodiment of the invention has a protective flap to protect the folded canopy from weathering elements.

Although the description above contains many specificities, these should not be construed as limiting the cope of the invention, but as merely providing illustrations of some of the presently preferred embodiments of this invention. For example, the plastic molded base member 46 could be replaced with a steel or wood base member; the base member could have a different shape or be made of an assembly of different parts; the U-bolts used to mount the base member to the bag support could be replaced with another fastening means like a threaded nut and bolt passing through the bag support or the frame of the cart; screw 66 fastening pivot arms 64 onto inner boss 60 could be replaced by snap fitting pivot hole 88 over a corresponding inner boss; one pivot arm 64 could be removed by only attaching one end of support bracket 76 to base member 46; pivot arm socket 72 could be eliminated with bracket 76 attaching another way to the pivot arm; both the support bracket and the mid-support bracket do not have to pass through sewn channels in the canopy, they could be attached using other fastening means like hook and loop straps; channel 40 could be replaced by another type of fastening means to connect the canopy's top edge to top 12, and sleeve rod 93 could be eliminated by rolling and sewing top edge 90, etc.

Thus the scope of the invention should be determined by the appended claims and their legal equivalents, rather than by the examples given.

What is claimed is:

1. A canopy assembly for a golf cart, the golf cart having a golf cart frame, a seating compartment, a golf bag compartment located rearward of the seating compartment, and a top assembly including a cart top positioned over the seating compartment, said canopy assembly being moveable between an extended first position where it at least partially covers the golf bag compartment and a folded second position where it is folded up to allow access to the golf bag compartment, said canopy assembly comprising:
   a canopy having a top and sides;
   a cover having a top and sides, wherein said top of said cover overlays at least a portion of said canopy top and said sides of said cover overlay at least a portion of said canopy sides in said folded second position;
   a releasable fastener retaining said canopy in said folded second position allowing access to said golf bag compartment such that said cover overlays at least a portion of said canopy assembly in said folded second position; and
   a frame structure for supporting said canopy, said frame structure being pivotally movable between the extended first position and folded second position.

2. The canopy assembly defined by claim 1, wherein the releasable fastener comprises a zipper.

3. The canopy assembly defined by claim 1, wherein the releasable fastener comprises a snap fastener.

4. The canopy assembly defined by claim 1, wherein the releasable fastener comprises a hook-and-loop fastener.

5. The canopy assembly defined by claim 1, wherein the releasable fastener comprises a mechanically interlocking fastener.

6. A canopy assembly for a golf cart, the golf cart having a golf cart frame, a seating compartment, a golf bag compartment located rearward of the seating compartment, and a top assembly including a cart top positioned over the seating compartment, the canopy assembly being moveable between an extended first position where it at least partially covers the golf bag compartment and a folded second position where it is folded up to allow access to the golf bag compartment, the canopy assembly comprising:
   a canopy having a top and sides;
   a cover overlaying at least a portion of the canopy top and the canopy sides in the folded second position;
   a releasable fastener retaining the canopy in the folded second position allowing access to the golf bag compartment such that the cover overlays at least a portion of the canopy in the folded second position; and
   a frame structure for supporting the canopy, the frame structure being pivotally movable between the extended first position and the folded second position.

7. The canopy assembly defined by claim 6, wherein the releasable fastener comprises a zipper.

8. The canopy assembly defined by claim 6, wherein the releasable fastener comprises a snap fastener.

9. The canopy assembly defined by claim 6, wherein the releasable fastener comprises a hook-and-loop fastener.

10. The canopy assembly defined by claim 6, wherein the releasable fastener comprises a mechanically interlocking fastener.

* * * * *